United States Patent
Graham-Cumming

(10) Patent No.: US 9,584,328 B1
(45) Date of Patent: Feb. 28, 2017

(54) EMBEDDING INFORMATION OR INFORMATION IDENTIFIER IN AN IPV6 ADDRESS

(71) Applicant: CLOUDFLARE, INC., San Francisco, CA (US)

(72) Inventor: John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 14/875,645

(22) Filed: Oct. 5, 2015

(51) Int. Cl.
H04L 29/06 (2006.01)
H04L 9/32 (2006.01)
H04L 29/12 (2006.01)

(52) U.S. Cl.
CPC ........ *H04L 9/3263* (2013.01); *H04L 61/1511* (2013.01); *H04L 61/2007* (2013.01); *H04L 61/2076* (2013.01); *H04L 61/6059* (2013.01); *H04L 63/0428* (2013.01); *H04L 2209/24* (2013.01); *H04L 2209/64* (2013.01)

(58) Field of Classification Search
CPC .. H04L 29/12933; H04W 28/12; H04W 92/02
See application file for complete search history.

(56) References Cited

U.S. PATENT DOCUMENTS

2004/0015725 A1* 1/2004 Boneh .................. H04L 63/166
713/160
2009/0161576 A1* 6/2009 Morris ............. H04L 29/12933
370/254

OTHER PUBLICATIONS

S. Blake-Wilson, Transport Layer Security (TLS) Extensions, Network Working Group, Request for Comments: 3546, Jun. 2003, 27 Pages. Included in applicant's IDS.*
S. Deering et al., Internet Protocol, Version 6 (IPv6), Network Working Group, Request for Comments: 2460, Dec. 1998, 36 pages.
S. Blake-Wilson, Transport Layer Security (TLS) Extensions, Network Working Group, Request for Comments: 3546, Jun. 2003, 27 pages.

* cited by examiner

*Primary Examiner* — Jason K Gee
(74) *Attorney, Agent, or Firm* — Nicholson De Vos Webster & Elliott LLP

(57) ABSTRACT

A network address includes a predefined portion that identifies a hostname, where the predefined portion is less than all of the network address. A request is received for a secure session at the network address. The hostname is identified from the predefined portion of the network address and a secure session negotiation is made including returning a digital certificate for the identified hostname.

18 Claims, 7 Drawing Sheets

EMBEDDING INFORMATION OR INFORMATION IDENTIFIER IN AN IPV6 ADDRESS

FIELD

Embodiments of the invention relate to the field of network communications; and more specifically, to embedding information or information identifier in an IPv6 address.

BACKGROUND

A main advantage of IPv6 versus IPv4 is the increase in the address space. An IPv6 address is 128 bits compared to 32 bits in IPv4. An organization may be allocated an address space that is relatively large in size. For instance, a service that allocates an IPv6 address for each customer may have many more IPv6 addresses than customers. For example, a common IPv6 allocation is a /32 network prefix, which allows up to $2^{96}$ addresses being available for assignment.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
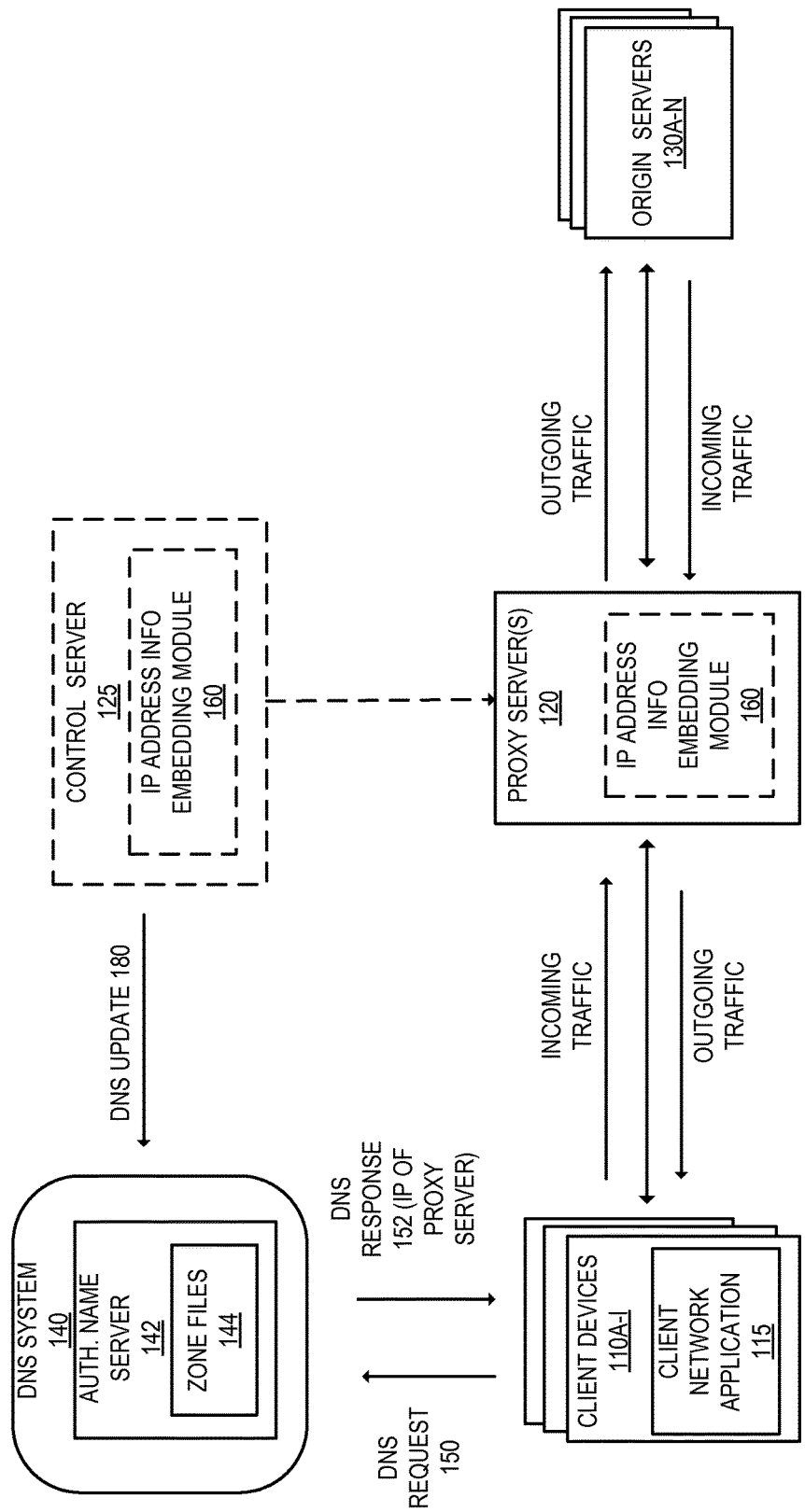
FIG. 1 illustrates an exemplary system according to some embodiments described herein.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In an embodiment, an IPv6 address is assigned from a large range of IPv6 addresses where a portion of the assigned IPv6 address is used for information or other unique identification. For instance, in a specific embodiment, a first portion of an IPv6 address is reserved for customer identification and a second portion is used to embed other information or information identifiers. As a specific example assuming 96 bits that can be allocated, the first portion may be 32 bits and could be used for the customer identification and the second portion may be 64 bits used for other information or information identifiers.

In an embodiment, information embedded in a portion of the IPv6 address is used to identify a zone. This may allow, for example, the zone to be determined with receipt of a first IP packet without the need to look at a host header or a Server Name Identification (SNI) header. In the case of Secure Sockets Layer (SSL) or Transport Layer Security (TLS), this allows the server to properly identify the certificate to send to the requesting client. As another example, if the zone is identified at the TCP connection time, information about the zone can be preloaded thereby allowing the service to operate more quickly. As another example, if a zone is identified and matches a zone that has been banned or blacklisted, the connection can be dropped more quickly. As another example, if SNI is used, the service may match the identified zone with the SNI information and reject a mismatch.

In an embodiment, information embedded in a predefined portion of the IPv6 address is used to identify one or more configuration settings. These configuration setting(s) may be used for performance reasons and/or security reasons. For example, a configuration setting embedded in a predefined portion of the IPv6 address may indicate a priority level that can be used when processing traffic (e.g., allocate more resources to a zone with a higher priority level, forward the traffic to a specific machine that has relatively higher processing power for traffic with a zone that has a higher priority level). As another example, a configuration setting embedded in a predefined portion of the IPv6 address may indicate that a zone is under attack which may allow a network receiving an IP packet with that configuration setting to filter that packet, perform grey listing, or take other action. As another example, a configuration setting embedded in a predefined portion of the IPv6 address may indicate that the zone is configured only to accept secure session connections (e.g., SSL or TLS connections) such that any packets received on port 80 (used for unsecure session connections) are blocked.

In an embodiment, information embedded in a portion of the IPv6 address may be used to identify geographic locations of the world. For instance, different IP addresses may be assigned to different regions of the world by providing different IP addresses to different DNS recursors and/or by looking at a client-subnet field from Extension Mechanisms from DNS (EDNS0). The client subnet allows IP address information from the client to be included in the DNS request which allows the DNS system to more accurately respond with the optimal IP address of the edge server to the client. In a specific example, a first portion of the IPv6 address is used to identify the customer and a second portion of the IPv6 address is used to identify a region of the world. The request could be routed to the server nearest to the end user and thus improve performance.

FIG. 1 illustrates an exemplary network architecture that use embodiments described herein. The service illustrated in FIG. 1 includes a set of proxy server(s) 120 that are situated between the client computing devices 110A-I and the origin server(s) 130A-N. In one embodiment, the proxy server(s) 120 are reverse proxy servers. Certain network traffic is received and processed through the set of proxy server(s) 120. For example, web traffic (e.g., HTTP requests/responses, HTTPS requests/responses, SPDY requests/responses, HTTP/2 requests, responses, etc.) for domains handled by the origin servers 130A-N may be received and processed at the proxy server(s) 120. In one embodiment, domain owners are customers of the cloud-based proxy service and certain network traffic for their websites are received and processed at the proxy server(s) 120.

The client devices 110A-I are computing devices (e.g., laptops, workstations, smartphones, palm tops, mobile phones, tablets, gaming systems, set top boxes, wearable devices, etc.) that are capable of transmitting and/or receiving network traffic. Each of the client devices 110A-I executes a client network application that is capable of transmitting and/or receiving network traffic. For example, the client network application may be a web browser or other application that can access network resources (e.g., web pages, images, word processing documents, PDF files, movie files, music files, or other computer files) using the client network application. The client devices 110A-I may each make a DNS request 150 to the DNS system 140 for a particular hostname and receive a DNS response 152 that includes an IP address of the proxy server(s) 120.

The origin servers 130A-N are computing devices that may serve and/or generate network resources (e.g., web pages, images, word processing documents, PDF files movie files, music files, or other computer files). An origin server 130A-N may also be another proxy server to the server that serves and/or generates network resources. Although not illustrated in FIG. 1, it should be understood that the network resources of the origin servers 130A-N may be stored separately from the device that responds to the requests. Some of the origin servers 130A-N may handle multiple domains that resolve to the proxy server(s) 120. For example, a single origin server 130 may handle multiple domains owned by the same domain owner or different domain owners through use of virtual hosting. In one embodiment, the virtual hosting is name-based virtual hosting where multiple websites (domains), which may or may not be owned or operated by the same domain owner, are hosted on the same IP address.

The service may provide different services for customers. By way of example, the service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In an embodiment and as described in greater detail later herein, the service embeds information in a predefined portion of an IPv6 address information or other unique identification that is used by the proxy server(s) 120 when processing network traffic. In some embodiments, customers provision the service through DNS. For example, DNS record(s) of a customer are changed such that DNS records of hostnames point to an IP address of a proxy server instead of the origin server. In some embodiments, the authoritative name server of the customer's domain is changed to an authoritative name server of the service and/or individual DNS records are changed to point to the proxy server (or point to other domain(s) that point to a proxy server of the service). For example, the customers may change their DNS records to point to a CNAME record that points to a proxy server of the service. In one embodiment, customers may use the control server 125 to change their authoritative name server to the authoritative name server 142 and/or change their zone file records to have their domain point to the proxy server 120.

The DNS system 140 is used to refer to the DNS system as a whole and includes multiple DNS servers to resolve DNS requests. As illustrated, the DNS system 140 includes the authoritative name server 142, which is an authoritative name server for the service. The authoritative name server 142 may be the authoritative name server for the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed.

Although not illustrated in FIG. 1, in one embodiment the service includes multiple nodes (referred herein as "proxy service nodes"). Each proxy service node may include any of one or more proxy servers, one or more control servers, one or more DNS servers (e.g., one or more authoritative name servers), and one or more other pieces of networking equipment (e.g., one or more routers, switches, hubs, etc.). The proxy service node may be part of the same physical device or multiple physical devices. For example, the proxy server(s), control server(s), and DNS server(s) may be virtual instances running on the same physical device or may be separate physical devices. Each proxy service node may be part of a data center or a collocation site.

The service may also include the control server 125, which may be owned or operated by the service. In one embodiment, the control server 125 provides a set of tools and interfaces for customers (e.g., domain owners) to configure security settings of the service. As will be described in greater detail, in some embodiments the control server 125 may be used to embed information and/or identifiers in a network address such as an IPv6 address.

In some embodiments, the service includes multiple proxy servers that are geographically distributed. For example, in some embodiments, the service uses multiple proxy service nodes that are geographically distributed to decrease the distance between requesting client devices and content. The authoritative name servers may have a same anycast IP address and the proxy servers may have a same anycast IP address. As a result, when a DNS request is made, the network transmits the DNS request to the closest authoritative name server (in terms of the routing protocol metrics). That authoritative name server then responds with one or more IP addresses of one or more proxy servers within the proxy service node. Accordingly, a visitor will be bound to that proxy server until the next DNS resolution for the requested hostname (according to the TTL (time to live) value as provided by the authoritative name server). In some embodiments, instead of using an anycast mechanism, embodiments use a geographical load balancer to route traffic to the nearest proxy service node.

The service embeds information and/or unique identification in one or more predefined portions of an IPv6 address that is used by the proxy server(s) 120 and/or other networking equipment when processing network traffic. For instance, the control server 125 and/or the proxy server(s) 120 include an IP address information embedding module 160 that is configured to embed information and/or unique identification in predefined portion(s) of an IPv6 address.

In an embodiment, information embedded in a predefined portion of the IPv6 address is used to identify a zone. This may allow, for example, the zone to be determined with receipt of a first IP packet without the need to look at a host header or a Server Name Identification (SNI) header. In the case of Secure Sockets Layer (SSL) or Transport Layer Security (TLS), this allows the server to properly identify the certificate to send to the requesting client. SSL and TLS provide secure network connections and are commonly used to protect network communication. An SSL or TLS client and server negotiate a set of parameters to establish a secure session in a process called a handshake. In traditional SSL, the handshake procedure occurs prior to the HTTP request that includes the host header. Thus, in traditional SSL, during the handshake procedure, the server does not know the destination host (the zone). This can cause problems if name-based virtual hosting is used where multiple zones share the same IP address. TLS, which is the successor to SSL, supports an extension to the handshake procedure called Server Name Indication (SNI). SNI is described in RFC 3546, June 2003. SNI allows the client to transmit the destination hostname during the handshake procedure. This allows the server to determine the proper certificate to send to the client. If SNI is used, a server may use name-based virtual hosting without having an IP address for each virtual host and the appropriate certificate can be returned depending on the indicated host. SNI, however, is not supported by all browsers and/or operating systems. As a result, many servers do not support SSL and name-based virtual hosting. In an embodiment, information embedded in a predefined portion of the IPv6 address is used to identify a zone, regardless of whether the client supports SNI.

Figure 2:
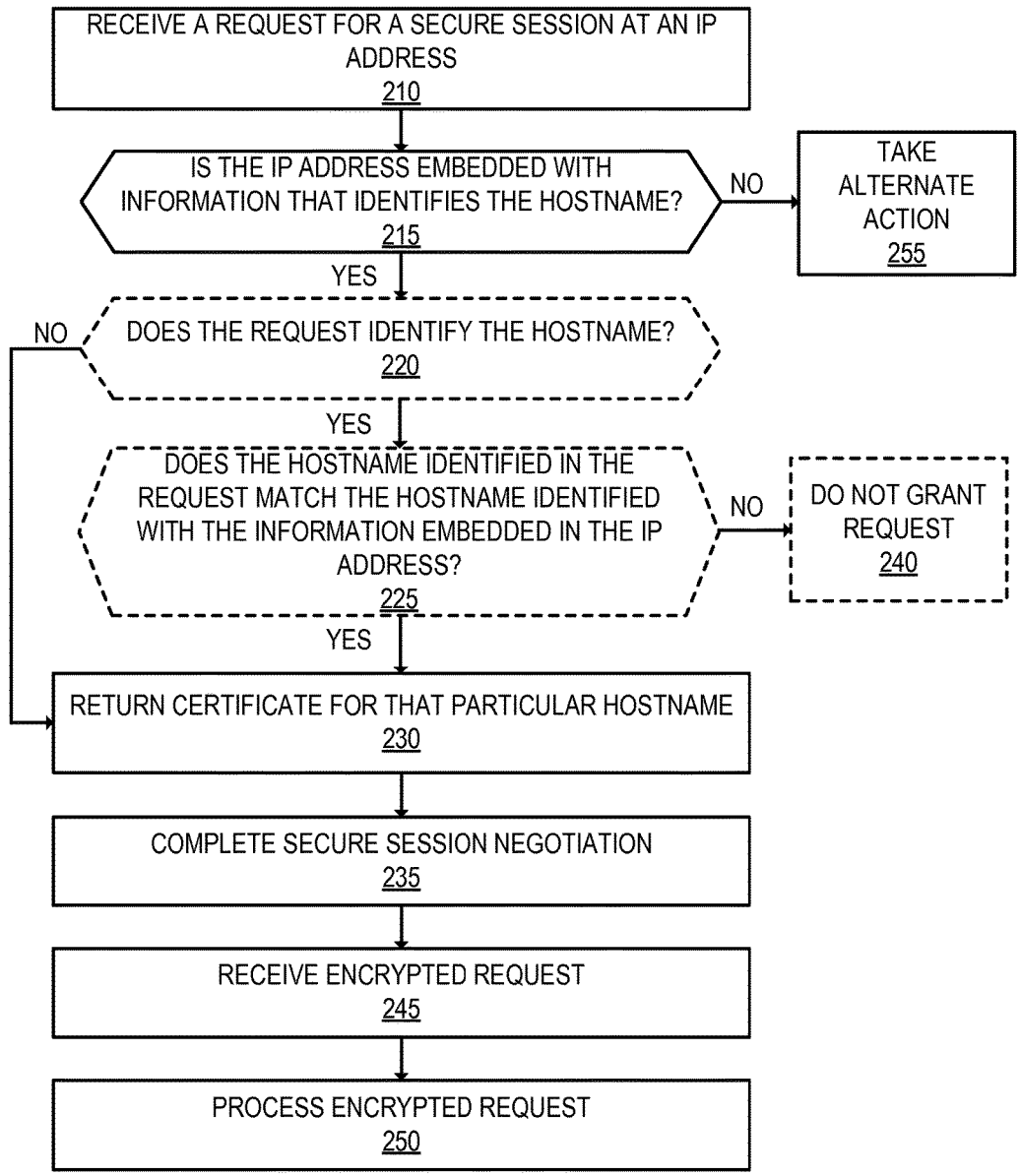
FIG. 2 is a flow diagram that illustrates exemplary operations for establishing a secure session where the IP address identifies the zone according to an embodiment.

FIG. 2 is a flow diagram that illustrates exemplary operations for establishing a secure session where the IP address identifies the zone according to an embodiment. The operations of FIG. 2 and other flow diagrams will be described with reference to the exemplary embodiment of FIG. 1. However, it should be understood that the operations of FIG. 2 and the other flow diagrams can be performed by embodiments of the invention other than those discussed with reference to FIG. 1, and the embodiments discussed with reference to FIG. 1 can perform operations different than those discussed with reference to FIG. 2 and the other flow diagrams.

At operation 210, the proxy server 120 receives a request for a secure session from a client computing device 110. For example, the proxy server 120 receives an SSL or TLS client-hello message from the client computing device 110. The request may be received at the proxy server 120 as a result of DNS for the hostname resolving to an IP address of the proxy server 120. Next, at operation 215, the proxy server 120 determines whether the IP address in which the request is directed is embedded with information that identifies the hostname. For example, the proxy server 120 may parse the IP address and look for a predefined portion of the IP address for a hostname identifier. Upon finding the hostname identifier, the proxy server 120 may determine the host that is identified by the hostname identifier. The proxy server 120 may store an identifier to hostname mapping or request the hostname from a remote device that stores an identifier to hostname mapping. If a hostname is found that matches an identifier included in the IP address, then flow moves to operation 220; otherwise flow moves to operation 255 where alternative action is taken (e.g., the proxy server 120 may look for a SNI extension in the request and if available, return the matching certificate that matches the host included in the SNI extension). The IP address may also have a predefined portion that identifies a customer of the domain.

At operation 220, which is optional in an embodiment, the proxy server 120 determines whether the request identifies the hostname. For example, the request may specify the hostname in an SNI extension included in the request. If the request identifies the hostname, then flow moves to operation 225; otherwise flow moves to operation 230. At operation 225, the proxy server 120 determines whether the hostname identified in the request (e.g., through the SNI extension) matches the hostname identified with the information embedded in the IP address. If the hostnames do not match, then flow moves to operation 240 where the proxy server 120 does not grant the request. Thus, for example, the proxy server will reject a connection if the hostname identified through the SNI extension does not match the hostname identified in the IP address. If the hosts match, then flow moves to operation 230.

At operation 230, the proxy server 120 returns the certificate bound to the destination hostname identified through use of the information embedded into the IP address to the requesting client computing device 110. For example, the proxy server 120 may include a certificate store that includes certificates bound to destinations and may access that store to retrieve the certificate that is bound to the identified destination. The proxy server 120 may request the certificate (e.g., from the appropriate origin server) if it does not currently have access to the certificate. Flow moves from operation 230 to operation 235 where the proxy server 120 and the client computing device 110 complete the secure session negotiation. This may include the proxy server 120 and the client computing device 110 determining the cryptographic protocol used for the encryption, establishing session keys for the secure connection, etc. Flow moves from operation 235 to operation 245.

At operation 245, the proxy server 120 receives an encrypted request from the client computing device 110 (e.g., an HTTPS request). The encrypted request was encrypted using the negotiated cryptographic parameters. Next, at operation 250, the proxy server 120 processes the encrypted request. In one embodiment, the proxy server 120 determines the hostname by analyzing the information embedded in the predefined portion of the destination IP address and sends the encrypted request to the origin server 130 to process the request. In another embodiment, the proxy server 120 decrypts the encrypted request and performs a set of one or more operations on the decrypted request. For example, the proxy server 120 may determine whether the requested resource is available in cache to the proxy server 120 and return the cached resource (encrypted) if available. As another example, if the origin server 130 for the destination hostname does not support secure sessions, then the proxy server 120 may decrypt the encrypted request and transmit the request unencrypted to the origin server 130 for further processing.

In an embodiment, information embedded in a portion of the IPv6 address is used to identify one or more configuration settings. These configuration setting(s) may be used for performance reasons and/or security reasons. For example, a configuration setting embedded in a predefined portion of the IPv6 address may indicate a priority level that can be used when processing traffic (e.g., allocate more resources to a zone with a higher priority level, forward the traffic to a specific machine that has relatively higher processing power for traffic with a zone that has a higher priority level). As another example, a configuration setting embedded in a predefined portion of the IPv6 address may indicate that a zone is under attack which may allow a network receiving an IP packet with that configuration setting to filter that packet, perform grey listing, or take other action. As another example, a configuration setting embedded in a predefined portion of the IPv6 address may indicate that the zone is configured only to accept secure session connections (e.g., SSL or TLS connections) such that any packets received on port 80 (used for unsecure session connections) may be blocked.

Figure 3:
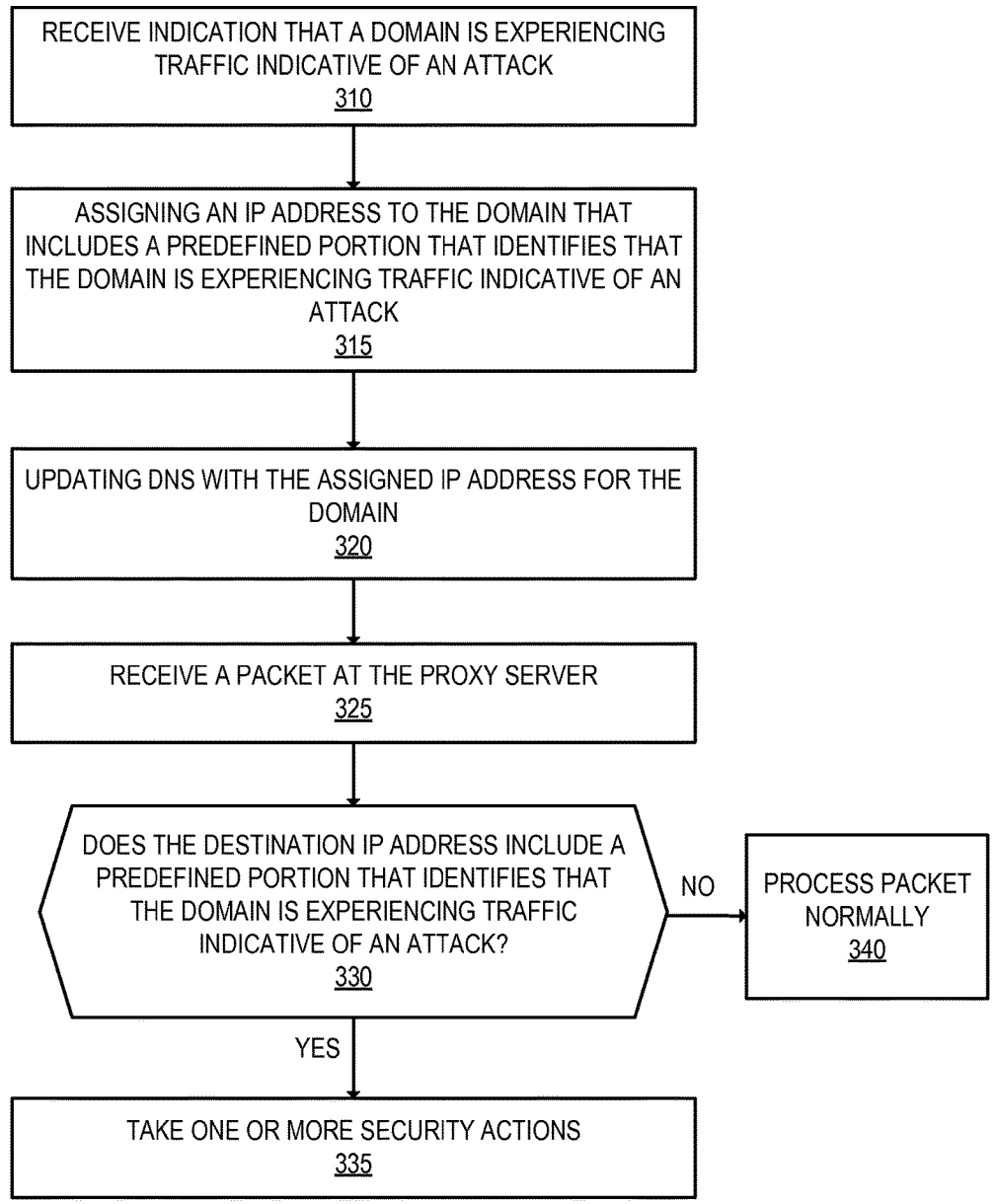
FIG. 3 is a flow diagram that illustrates exemplary operations for assigning an IP address with a predefined portion that identifies that a zone is experiencing traffic indicative of an attack and responding to such an attack, according to one embodiment.

FIG. 3 is a flow diagram that illustrates exemplary operations for assigning an IP address with a predefined portion that identifies that a zone is experiencing traffic indicative of an attack and responding to such an attack, according to one embodiment. At operation 310, an indication that a hostname is experiencing traffic indicative of an attack is received. In one embodiment, the indication is received at the control server 125 based on the hostname receiving an abnormally high amount of traffic as reported by the proxy servers 120 and/or at the proxy servers themselves. For example, an abnormally high amount of traffic flow directed to an IP address assigned to the hostname may be detected. For example, the proxy service node may determine that the number of packets being received to that IP address is abnormally high, the amount of bandwidth being consumed is abnormally high, the number of UDP packets per second is abnormally high, the number of TCP packets per second is abnormally high, the number of open connections is abnormally high, and/or the ratio of successfully open connections versus failed connections is abnormally high. Of course, these are just examples, and the proxy server 120 may determine that there is abnormal flowing traffic in any number of ways. As another example, the indication may also be received as a result of the domain owner indicating that the hostname is experiencing traffic indicative of an attack through receipt of a message from the domain owner. This message may be sent using the control server 125 according to some embodiments. The message may also be sent as a result of an administrator of the service detecting a potential attack.

After receiving an indication that the hostname is experiencing traffic indicative of an attack, flow moves to operation 315 where the hostname is assigned a different IP address that includes a predefined portion that identifies that the hostname is experiencing traffic indicative of an attack.

In one embodiment, the assigned IP address also includes another predefined portion that identifies the hostname being assigned that IP address. The control server 125 and/or a proxy server 120 may assign this different IP address to the hostname. After assigning the updated IP address to the hostname, flow moves to operation 320 where DNS is updated with the assigned IP address for the hostname. For example, the control server 125 may transmit a DNS update 180 to the DNS system such that DNS request for the hostname return the updated IP address for the hostname.

Next, at operation 325, a packet is received at the proxy server 120. The proxy server 120 determines whether the destination IP address includes a predefined portion that identifies that the hostname is experiencing traffic indicative of an attack. If it does not, then flow moves to operation 340 where the packet is processed normally. If the destination IP address does include a predefined portion that identifies that the hostname is experiencing traffic indicative of an attack, then flow moves to operation 335 where the proxy server takes one or more security actions. Example security actions include: rate limiting the traffic for that destination IP address; dropping the packet; routing the packet to a particular data center or hardware device that is dedicated to handling attacks (which may have a relatively large network connection (a large amount of bandwidth) and/or be particularly robust to handle the attack such as including network card(s) with a relatively large buffer (typically larger than conventional network devices) to store a relatively large amount of packets, extra processing units, larger memory, etc., to handle the attack); dropping the traffic received from potential attackers, presenting one or more challenges to visitors (such as a CAPTCHA challenge), increasing the amount of resources and/or the types of resources being cached for the attacked hostname(s), and/or increasing the amount of time a rule or resource is cached. In one embodiment, in addition to or in lieu of the proxy server 120 being configured to take one or more security actions, other types of network equipment of the proxy service node (e.g., router(s), switch(es), hub(s), etc.) may be configured to take one or more security actions.

Other types of challenges that can be presented include a computationally expensive to solve and/or requiring a client-side script (e.g., JavaScript, etc.) or a plug-in (e.g., Flash, Java applet, etc.) to execute to solve, such as a math problem that takes approximately 5 seconds to solve on average. Since most attacks are performed by a script or bot, they will not be able to complete the problem and they will not pass the challenge and their request will be blocked. However, most client network applications (e.g., browsers) will be able to complete the challenge and therefore the request will not be blocked. If the challenge is passed, then a cookie may be set and the client network application will not be challenged again for a period of time that may be configurable by the domain owner.

When the traffic returns to a level that is not indicative of an attack, the IP address for the hostname may be assigned such that a predefined portion does not identify that the hostname is experiencing traffic indicative of an attack.

Figure 4:
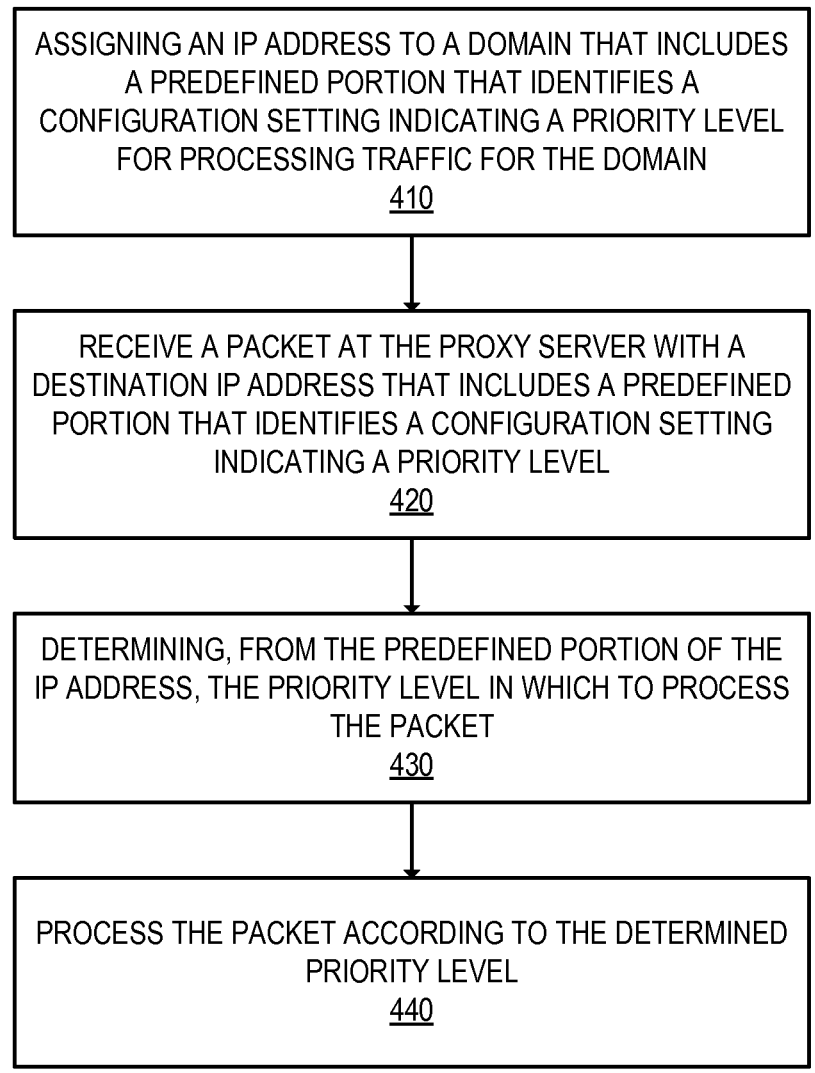
FIG. 4 is a flow diagram that illustrates exemplary operations for assigning an IP address with a predefined portion that identifies that a configuration setting indicating a priority level and processing traffic received at that IP address according to the priority level according to an embodiment.

FIG. 4 is a flow diagram that illustrates exemplary operations for assigning an IP address with a predefined portion that identifies that a configuration setting indicating a priority level and processing traffic received at that IP address according to the priority level according to an embodiment. At operation 410, an IP address is assigned to a hostname where the IP address includes a predefined portion that identifies a configuration setting indicating a priority level for processing traffic for the hostname. The control server 125 and/or a proxy server 120 may assign this IP address. The IP address may also be assigned such that another predefined portion of the IP address identifies a customer of the hostname. Next, at operation 420, a packet is received at the proxy server 120 at the IP address that includes the predefined portion that identifies the configuration setting indicating the priority level for processing traffic of the hostname. Next, at operation 430, the proxy server 120 determines, from the predefined portion of the IP address, the priority level in which to process the traffic. The proxy server 120 may store an identifier to priority level mapping or request the priority level from a remote device that stores an identifier to priority level mapping. Next, at operation 440, the proxy server 120 processes the packet according to the determined priority level. For instance, if the priority level is a relatively high, the proxy server 120 may allocate more resources to process the traffic and/or forward the traffic to a specific machine that has relatively higher processing power.

Figure 5:
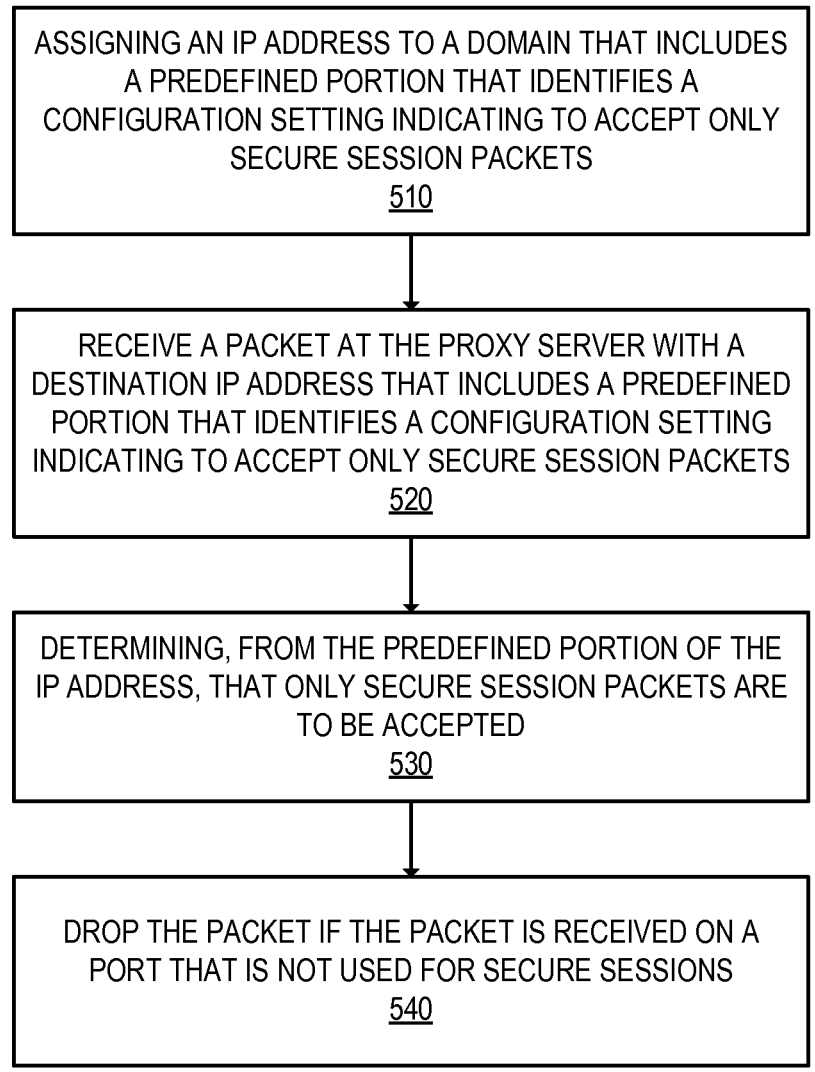
FIG. 5 is a flow diagram that illustrates exemplary operations for assigning an IP address with a predefined portion that identifies that a configuration setting indicating that only secure session packets should be accepted according to an embodiment.

FIG. 5 is a flow diagram that illustrates exemplary operations for assigning an IP address with a predefined portion that identifies that a configuration setting indicating that only secure session packets should be accepted according to an embodiment. At operation 510, an IP address is assigned to a hostname where the IP address includes a predefined portion that identifies a configuration setting indicating that only secure session packets should be accepted. The control server 125 and/or a proxy server 120 may assign this IP address. The IP address may also be assigned such that another predefined portion of the IP address identifies a customer of the hostname. Next, at operation 520, a packet is received at the proxy server 120 at the IP address that includes the predefined portion that identifies the configuration setting indicating that only secure session packets should be accepted. Next, at operation 530, the proxy server 120 determines, from the predefined portion of the destination IP address, that only secure session packets should be accepted. The proxy server 120 may make the decision with local information or may make a request to a remote device to determine whether the predefined portion included in the destination IP address indicates that only secure session packets should be accepted. Next, at operation 540, the proxy server 120 drops the packet if it is received on a port that is not used for secure sessions. For example, if the packet is received at port 80 (commonly used by regular HTTP) and the IP address includes a predefined portion that identifies a configuration setting that indicates only secure session packets should be accepted (e.g., HTTPS), the proxy server 120 will drop the packet.

Figure 6:
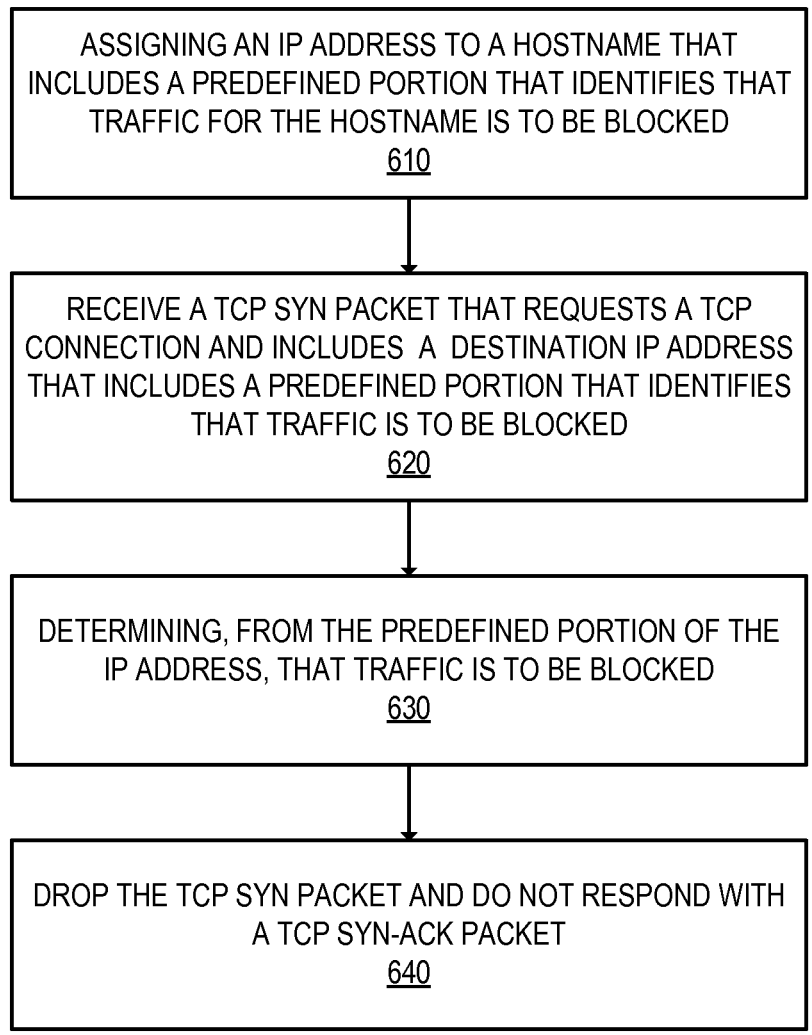
FIG. 6 is a flow diagram that illustrates exemplary operations for assigning an IP address with a predefined portion that identifies that traffic for the hostname is to be blocked.

FIG. 6 is a flow diagram that illustrates exemplary operations for assigning an IP address with a predefined portion that identifies that traffic for the hostname is to be blocked according to an embodiment. At operation 610, an IP address is assigned to a hostname where the IP address includes a predefined portion that identifies a configuration setting indicating that traffic for that hostname is to be blocked. The control server 125 and/or a proxy server 120 may assign this IP address. The IP address may also be assigned such that another predefined portion of the IP address identifies a customer of the hostname. Next, at operation 620, a TCP SYN packet is received at the proxy server 120 that is requesting a TCP connection be established that includes a destination IP address that includes a predefined portion that identifies that traffic is to be blocked. This TCP SYN packet may be the first TCP packet of a TCP three-way handshake. Next, at operation 630, the proxy server 120 determines, from the predefined portion of the destination IP address, that traffic is to be blocked. The proxy server 120 may make the decision with local information (e.g., a list of identifiers that are to be blocked) or may make a request to a remote device to determine whether the predefined portion included in the destination IP address indicates that traffic is to be blocked. Next, at operation 640, the proxy server 120 drops the TCP SYN packet and does not respond with a TCP SYN-ACK packet. Thus, the proxy server 120 drops the TCP SYN packet directed at a destination IP address that includes a predefined portion that identifies a configuration setting that traffic is to be blocked.

Figure 7:
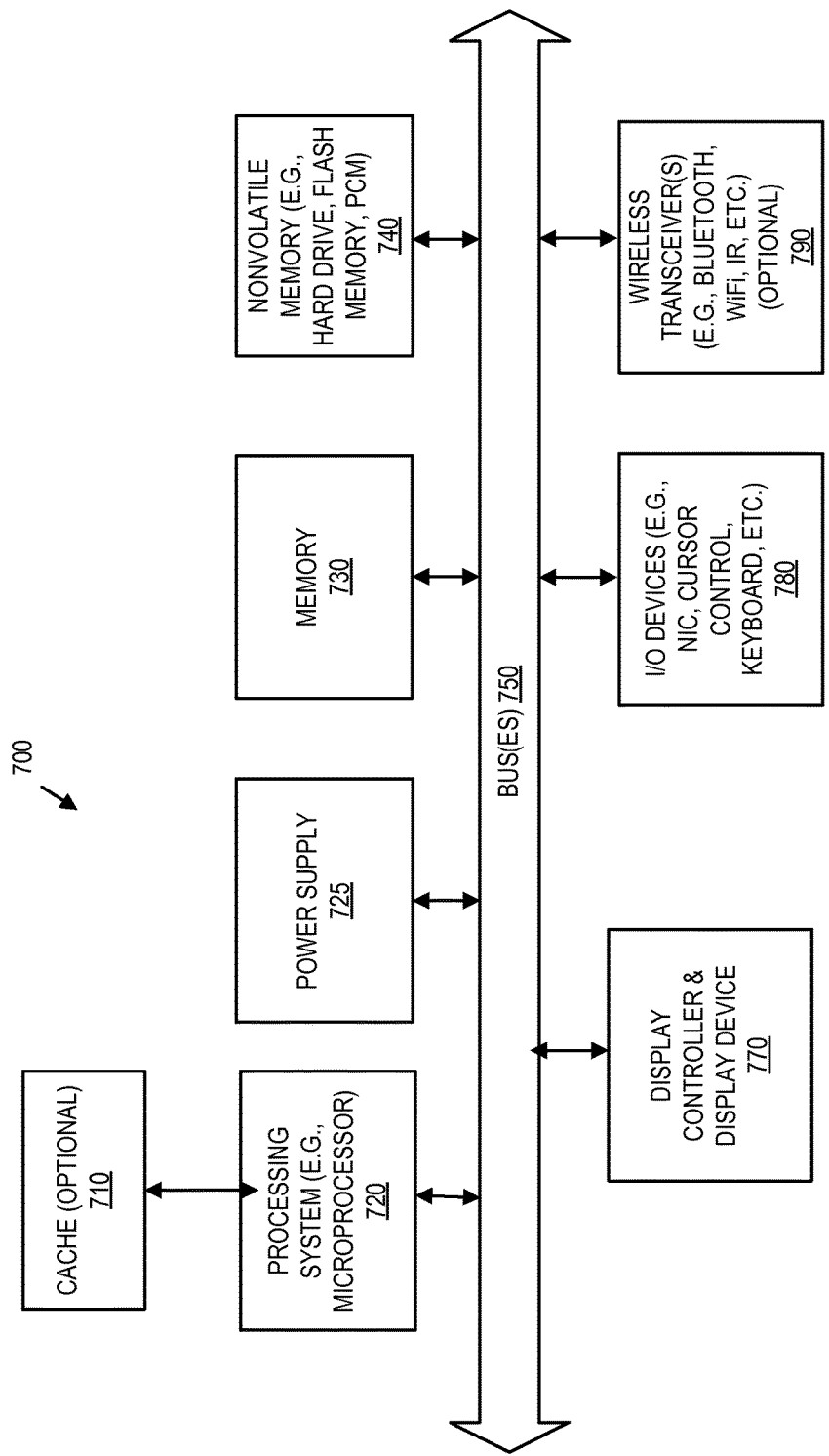
FIG. 7 is a block diagram illustrating a data processing system that can be used in an embodiment.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations described herein. The bus 750 interconnects the above components together and also interconnects those components to the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.). In one embodiment, the client device, caching system, and/or service device described herein may take the form of the computer system 700.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving a request for a secure session at a destination network address, wherein the destination network address includes a first predefined portion that identifies a hostname, wherein the first predefined portion is less than all of the destination network address;
identifying the hostname from the first predefined portion of the destination network address;
participating in a secure session negotiation including returning a digital certificate for the identified hostname;
receiving an indication that a hostname is experiencing traffic indicative of an attack;
assigning a second network address for the hostname, wherein the assigned second network address includes a second predefined portion that identifies that the hostname is experiencing traffic indicative of an attack; and
updating one or more Domain Name System (DNS) records such that a DNS request for the hostname returns the second network address.

2. The method of claim 1, further comprising:
receiving an encrypted request for an action to be performed on a resource that is hosted at an origin server for the hostname;
determining the origin server for the hostname without decrypting the encrypted request to view a host header; and
transmitting the encrypted request to the determined origin server for further processing.

3. The method of claim 1, further comprising:
receiving, at the second network address, a second request for an action to be performed on a second resource that is hosted at the origin server for the hostname;
identifying, from the second predefined portion of the second network address that the hostname is experiencing traffic indicative of an attack; and
taking one or more security actions in response to identifying that the hostname is experiencing traffic indicative of an attack.

4. The method of claim 3, wherein the one or more security actions include one or more of the following:
dropping packets for the second request;
causing one or more challenges to be presented to a sender of the second request and processing the second request including attempting to perform the action on the second resource if the one or more challenges are successfully passed;
routing packets for the second request to a dedicated data center or hardware device to process; and
rate limiting packets for the second request.

5. The method of claim 1, wherein the network address is an IPv6 address.

6. The method of claim 1, further comprising:
wherein the received request for the secure session identifies the hostname; and
determining that the hostname identified in the received request matches the hostname identified from the first predefined portion of the destination network address.

7. A non-transitory machine-readable storage medium that provides instructions that, when executed by a processor, cause said processor to perform operations comprising:

receiving a request for a secure session at a destination network address, wherein the destination network address includes a first predefined portion that identifies a hostname, wherein the first predefined portion is less than all of the destination network address;
identifying the hostname from the first predefined portion of the destination network address;
participating in a secure session negotiation including returning a digital certificate for the identified hostname;
receiving an indication that a hostname is experiencing traffic indicative of an attack;
assigning a second network address for the hostname, wherein the assigned second network address includes a second predefined portion that identifies that the hostname is experiencing traffic indicative of an attack; and
updating one or more Domain Name System (DNS) records such that a DNS request for the hostname returns the second network address.

8. The non-transitory machine-readable storage medium of claim 7 that provides instructions that, when executed by the processor, cause the processor to further perform operations comprising:
receiving an encrypted request for an action to be performed on a resource that is hosted at an origin server for the hostname;
determining the origin server for the hostname without decrypting the encrypted request to view a host header; and
transmitting the encrypted request to the determined origin server for further processing.

9. The non-transitory machine-readable storage medium of claim 7 that provides instructions that, when executed by the processor, cause the processor to further perform operations comprising:
receiving, at the second network address, a second request for an action to be performed on a second resource that is hosted at the origin server for the hostname;
identifying, from the second predefined portion of the second network address that the hostname is experiencing traffic indicative of an attack; and
taking one or more security actions in response to identifying that the hostname is experiencing traffic indicative of an attack.

10. The non-transitory machine-readable storage medium of claim 9, wherein the one or more security actions include one or more of the following:
dropping packets for the second request;
causing one or more challenges to be presented to a sender of the second request and processing the second request including attempting to perform the action on the second resource if the one or more challenges are successfully passed;
routing packets for the second request to a dedicated data center or hardware device to process; and
rate limiting packets for the second request.

11. The non-transitory machine-readable storage medium of claim 7, wherein the network address is an IPv6 address.

12. The non-transitory machine-readable storage medium of claim 7 that provides instructions that, when executed by the processor, cause the processor to further perform operations comprising:
wherein the received request for the secure session identifies the hostname; and determining that the hostname identified in the received request matches the hostname identified from the first predefined portion of the destination network address.

13. An apparatus, comprising:
a processor;
a non-transitory machine-readable storage medium coupled with the processor that stores instructions that, when executed by the processor, cause said processor to perform the following:
  receive a request for a secure session at a destination network address, wherein the destination network address includes a first predefined portion that identifies a hostname, wherein the first predefined portion is less than all of the destination network address;
  identify the hostname from the first predefined portion of the destination network address;
  participate in a secure session negotiation including returning a digital certificate for the identified hostname;
  receive an indication that a hostname is experiencing traffic indicative of an attack;
  assign a second network address for the hostname, wherein the assigned second network address includes a second predefined portion that identifies that the hostname is experiencing traffic indicative of an attack; and
  update one or more Domain Name System (DNS) records such that a DNS request for the hostname returns the second network address.

14. The apparatus of claim 13, wherein the non-transitory machine-readable storage medium further stores instructions that, when executed by the processor, cause said processor to perform the following:
  receive an encrypted request for an action to be performed on a resource that is hosted at an origin server for the hostname;
  determine the origin server for the hostname without decrypting the encrypted request to view a host header; and
  transmit the encrypted request to the determined origin server for further processing.

15. The apparatus of claim 13, wherein the non-transitory machine-readable storage medium further stores instructions that, when executed by the processor, cause said processor to perform the following:
  receive, at the second network address, a second request for an action to be performed on a second resource that is hosted at the origin server for the hostname;
  identify, from the second predefined portion of the second network address that the hostname is experiencing traffic indicative of an attack; and
  take one or more security actions in response to identifying that the hostname is experiencing traffic indicative of an attack.

16. The apparatus of claim 15, wherein the one or more security actions include one or more of the following:
  drop packets for the second request;
  cause one or more challenges to be presented to a sender of the second request and processing the second request including attempting to perform the action on the second resource if the one or more challenges are successfully passed;
  route packets for the second request to a dedicated data center or hardware device to process; and
  rate limit packets for the second request.

17. The apparatus of claim 13, wherein the network address is an IPv6 address.

18. The apparatus of claim 13, wherein the non-transitory machine-readable storage medium further stores instructions that, when executed by the processor, cause said processor to perform the following:
  wherein the received request for the secure session identifies the hostname; and
  determine that the hostname identified in the received request matches the hostname identified from the first predefined portion of the destination network address.

* * * * *